United States Patent
Sahay et al.

(10) Patent No.: US 9,671,230 B2
(45) Date of Patent: Jun. 6, 2017

(54) APPROACHES TO CROWDSOURCED-BASED WAIT TIME ESTIMATES

(71) Applicant: HARMAN INTERNATIONAL INDUSTRIES, INC, Stamford, CT (US)

(72) Inventors: Pratyush Sahay, Bangalore Karnataka (IN); Rajesh Biswal, Bangalore Karnataka (IN)

(73) Assignee: HARMAN INTERNATIONAL INDUSTRIES, INC, Stamford, CT (US)

( * ) Notice: Subject to any disclaimer, the term of this patent is extended or adjusted under 35 U.S.C. 154(b) by 0 days.

(21) Appl. No.: 14/737,399

(22) Filed: Jun. 11, 2015

(65) Prior Publication Data

US 2016/0363450 A1    Dec. 15, 2016

(51) Int. Cl.
| | |
|---|---|
| *G01C 21/20* | (2006.01) |
| *G06N 5/02* | (2006.01) |
| *G01C 21/26* | (2006.01) |
| *G06Q 50/00* | (2012.01) |

(52) U.S. Cl.
CPC ............ *G01C 21/20* (2013.01); *G01C 21/26* (2013.01); *G06N 5/02* (2013.01); *G06Q 50/01* (2013.01)

(58) Field of Classification Search
CPC ........ G01C 21/20; G01C 21/26; G06Q 50/01; G06N 5/02
USPC ........................................................ 701/465
See application file for complete search history.

(56) References Cited

U.S. PATENT DOCUMENTS

| | | | |
|---|---|---|---|
| 2008/0290182 A1* | 11/2008 | Bell ...................... | G06Q 10/04 235/61 V |
| 2013/0304534 A1 | 11/2013 | Mehta et al. | |
| 2014/0180848 A1* | 6/2014 | Argue ................... | G06Q 20/20 705/16 |

(Continued)

FOREIGN PATENT DOCUMENTS

| | | |
|---|---|---|
| EP | 0772837 A1 | 5/1997 |
| WO | 2008134352 A1 | 11/2008 |

OTHER PUBLICATIONS

Extended European Search Report for Application No. 16 17 1859, dated Oct. 10, 2016, 12 pages.

(Continued)

*Primary Examiner* — Anne M Antonucci
(74) *Attorney, Agent, or Firm* — Artegis Law Group, LLP (57) ABSTRACT

In one embodiment of the present invention, a wait time client enables prediction of wait times (e.g., time required to checkout at a grocery store) based on crowdsourced wait data. In operation, the wait time application downloads predicted wait data from a server. The predicted wait data reflects measured wait times for one or more location, such as the ticket line at a movie theater. The wait time client then selects a wait time data point that corresponds to a location of a point-of-interest. Based on the selected wait time data point, the wait time client determines a predicted wait time at the point-of-interest. Advantageously, by leveraging crowdsourced, deterministically measured wait times, the wait time clients enables the incorporation of realistic and up-to-date predicted wait times into the trip planning process.

18 Claims, 6 Drawing Sheets

(56) References Cited

U.S. PATENT DOCUMENTS

2015/0025799 A1    1/2015 Jackson et al.

OTHER PUBLICATIONS

Tadashi Okoshi et al: "Queuevadis", Information Processing in Sensor Networks, ACM, 2 Penn Plaza, Suite 701 New York NY 10121-0701 USA, Apr. 13, 2015 (Apr. 13, 2015), pp. 214-225, XP058069380, 001: 10.1145/2737095.2737120 ISBN: 978-1-4503-3475-4 * the whole document *.

Li Qiang et al: "QueueSense: Collaborative recognition of queuing on mobile phones", 2014 Eleventh Annual IEEE International Technicalfields Conference on Sensing, Communication, and Searched (IPC) Networking (SECON), IEEE, G06Q Jun. 30, 2014 (Jun. 30, 2014), pp. 230-238, GO1C XP032 708824, 001: 10.1109/SAHCN.2014.6990358 [retrieved on Dec. 16, 2014] * the whole document *.

Popsugar Smart Living "Grocery Store Checkout Line Wait times by City" Aug. 31, 2009, (10 pages) http://www.savvysugar.com/Grocery-Store-Checkout-Line-Wait-Times-City-4414543.

A Pragmatic Purist Blog "How to measure the average wait time in checkout lines of a grocery store" Jan. 3, 2011 (2 pages) https://nampark.wordpress.com/2011/01/03/how-to-measure-the-average-wait-time-in-checkout-line%E2%80%8F-of-a-grocery-store/.

Laasby, Gitte "Grocery store chain Kroger uses infrared cameras to reduce line at register" The Milwaukee-Wisconsin Journal Sentinel, May 3, 2013 (3 pages) http://www.jsonline.com/blogs/news/205798321.html.

Paul J. Nyden "Kroger uses new technology to reduce checkout wait time" Charleston Gazette-Mail Jul. 22, 2013 (5 pages) http://www.wvgazette.com/News/201307220081.

Mary Lariviere, Kellogg School of Management at Northwestern, "How Technology Can Significantly Imporove Your Trip To The Grocery Store" Business Insider May 3, 2013 (3 pages) http://www.businessinsider.com/technology-in-the-grocery-storye-2013-5?IR=T.

* cited by examiner

APPROACHES TO CROWDSOURCED-BASED WAIT TIME ESTIMATES

BACKGROUND

Field of the Invention

Embodiments of the present invention relate generally to navigation systems and, more specifically, to approaches to crowdsourced-based wait time estimates.

Description of the Related Art

A wide variety of planning tools are used to facilitate efficient time management. For example, a navigation tool may predict the quickest route to reach a point-of-interest, allowing users to minimize travel time. Further, some navigation tools allow users to search for different types of businesses and compare the distances and/or travel times between a current location and those different identified businesses. Irrespective of the specific planning information that is provided by the planning tool (i.e., an optimized route to travel, travel times to different identified businesses, etc.), such tools typically rely on predictive models to estimate portions of the planning process.

In general, the effectiveness of most planning tools is limited by the accuracy of the predictive models implemented in those tools. If portions of the planning process are not adequately addressed by the predictive models included in the planning tools, then the predictive models are undermined, and the power of the planning tool is reduced. For instance, a navigation tool that does not differentiate between the travel time to a downtown office at rush hour and the travel time to the downtown office at midnight on a Monday night can base travel time estimates on irrelevant data. Consequently, those tools can provide misleading travel time estimates.

Notably, the prediction models included in conventional planning tools typically neither directly address wait time requirements nor incorporate wait time estimates (e.g., lengths of time expected to wait in queues for services) into overall time estimates. Since many commonly planned events involve estimating wait times at points-of-sale (e.g., shopping for groceries, purchasing tickets, getting an oil change, etc.), the usefulness of conventional planning tools is limited. For instance, if the planning requirement is "estimate the quickest plan to see an emergency room doctor," then a planning tool that does not include a predictive model for wait time fails to consider the differences between wait times at trauma centers and general hospitals. Consequently, the accuracy of the planning tool is undermined.

If a user desires wait-time guidance at a particular destination, such as a grocery store, then the user must resort to manual approaches for determining those wait times. For example, the user might have to call the destination and verbally query the workers regarding the wait time. Alternatively, some destinations and service providers provide general guidelines for wait times on their websites. For instance, airports may provide estimated wait times at security lines or for delayed flights.

While such manual techniques enable users to obtain some amount of information relevant to wait times, such manual effort is tedious for users and also can increase the time required for overall planning to unacceptable levels. Further, the manually-obtained information is not necessarily reliable or accurate and, therefore, may need to be updated frequently.

As the foregoing illustrates, more effective techniques for estimating wait times would be useful.

SUMMARY

One embodiment of the present invention sets forth a computer-implemented method for predicting wait times at points-of-interest. The method includes receiving data points from a server machine, where each data point reflects at least one crowdsourced measured wait time and is associated with any one of several different points-of interest; receiving a request to predict a wait time at a first point-of-interest that is included in the several different points-of-interest; selecting a first data point included in the data points based on the first point-of-interest; and determining a predicted wait time based on the first data point.

Further embodiments provide, among other things, a system and a non-transitory computer-readable medium configured to implement the method set forth above.

At least one advantage of the disclosed techniques is that a user may obtain predicted wait times at points-of-interest based on previously measured wait times experienced by any number of other users. Using the predicted wait times, the user may knowledgeably select among various planning options, such as which grocery store to visit. For instance, and without limitation, the user may select a planning option that optimizes the predicted wait time or a planning option that optimizes an overall errand time (i.e., predicted travel time and predicted wait time).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Crowdsourced Planning System

Figure 1A:
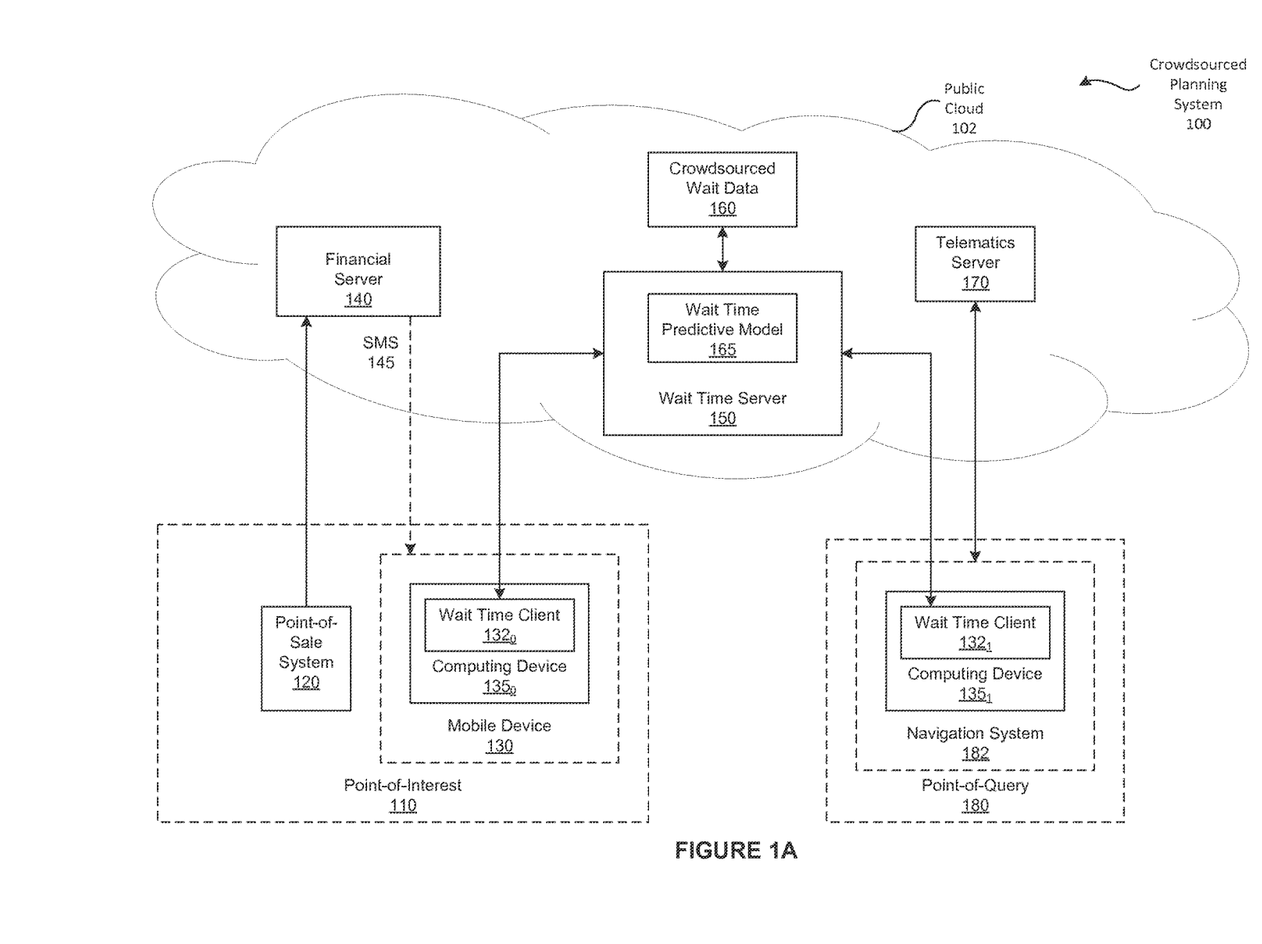
FIG. 1A illustrates a crowdsourced planning system configured to implement one or more aspects of the various embodiments.

FIG. 1A illustrates a crowdsourced planning system configured to implement one or more aspects of the various embodiments. As shown, the crowdsourced planning system 100 includes, without limitation, a point-of-interest 110, a point-of-query 180, and a public cloud 102. In alternate embodiments, the crowdsourced planning system 100 may include any distributed computer system instead of, or in addition to, the public cloud 102. In yet other embodiments, the crowdsourced planning system 100 may not include the public cloud 102 and, instead, the crowdsourced planning system 100 may include a single computing unit that implements any number of processing units (e.g., central processing units and/or graphical processing units in any combination).

The point-of-interest 110 is a place (i.e., store, Amusement Park, car wash, movie theatre etc.) that is involved in one or more planning operations. Notably, at each of the points-of-interest 110 included in the crowdsourced planning system 100, a queue may form. As used herein, a queue refers to any line of people that are waiting for an event to occur. For example, and without limitation, the point-of-interest 110 could correspond to a grocery store and the queue could correspond to the line of people that are waiting to purchase groceries. In general, the crowdsourced planning system 100 may include any number of points-of-interest 110, and the points-of-interest 110 may change dynamically (reflecting different planning processes and/or planning options). Further, as part of the planning process, the point-of-interest 110 may be associated with one or more times-of-interest. For example, if the planning process were to involve determining the wait at a grocery store at noon, then the point-of-interest 111 could be the grocery store and the time-of-interest could be noon.

As shown, the point-of-interest 110 includes a point-of-sale system 120. The point-of-sale-system 120 may be any device that facilitates a financial transaction, such as a cash register. In alternate embodiments, the point-of-interest 110 may not include a point-of-sale system 120. For example, in some embodiments, the point-of-interest 110 may be a service, such as an Amusement Park ride, the queue may be the wait to board the ride, and the point-of-interest 110 does not include the point-of-sale system 120. Typically, if the point-of-interest 110 includes the point-of-sale system 120, then a point-of-sale corresponds to the point-of-interest 110 and a time-of-sale corresponds to the time-of-interest.

The point-of-query 180 is a place that corresponds to the location at which a request for planning guidance (i.e., a "query") is generated. For example, the point-of-query 180 could be a living room of a house and a desktop computer could generate a request for an estimated wait time for security screening at an Airport. In other embodiments, the point-of-query 180 may correspond to the location of a smartphone. In general, the point-of-query 180 is associated with a time-of-query (a time at which the request is generated) and may change locations dynamically.

The public cloud 102 provides access to encapsulated shared resources (e.g., software applications, data, etc.) over a public network, such as the Internet, to clients at the point-of-query 180 and the point-of-interest 110. In alternate embodiments, the public cloud 102 may provide access to any type of shared resource to any number of clients at any number of stationary and mobile locations in any combination. In other embodiments, the public cloud 102 may be replaced with any type of cloud computing environment, such as a private or a hybrid cloud. As shown, the public cloud 102 includes a telematics server 170 that communicates with a navigation system 182 located at the point-of-query 180. For example, and without limitation, a telematics server provided by a car manufacturer could provide communication and control capabilities (e.g., Global Positioning System (GPS) functionality, remote door unlocking services, etc.) to a car navigation system "on-board" a moving vehicle.

In one common planning operation, the navigation system 182 included in a car communicates with the telematics server 170 to automatically create driving plans from the point-of-query 180 (i.e., current location of the car) to any number of points-of-interest 110 (e.g., grocery stores, Amusement Parks, car washes, etc.). In general, such driving plans may consider a variety of factors and options, such as time of day, local roads vs highway travel, and so forth. However, the scope of conventional, automated navigation systems is limited to travel metrics, such as travel time and travel distance, and does not typically extend to other considerations, such as wait time at a point-of-interest, that also impact the overall expended time. For example, and without limitation, some conventional navigation systems could estimate the fastest driving route to a particular type of point (e.g., a grocery store) based on a predictive model, but provide no insight into any wait times after arrival at the destination point. If the wait time at two grocery stores varies dramatically, then the fastest driving route may not correspond to the fastest total overall expended time (from the current destination to the cash register at the grocery store), and the value of the predictive model is undermined.

As illustrated by this example, predictive models included in conventional planning systems typically do not provide insight into wait times. Accordingly, some users may supplement the data automatically provided by conventional planning systems with additional, manually acquired data. For example, and without limitation, some users could call a few grocery stores to find out which grocery store "sounds" least busy. Not only is such manual supplementation time consuming, but also relies on subjective opinions of different workers at different grocery stores.

Estimating Wait Times

To address the foregoing concerns, the public cloud 102 includes a wait time server 150 that provides wait time estimates based on crowdsourced wait data 160. The wait time server 150 provides functionality for both populating the crowdsourced wait data 160 and calculating predicted wait times for any number of the points-of-interest 110. To create and maintain the crowdsourced wait data 160, the wait time server 150 communicates with wait time clients 132 at the points-of-interest 110, receives objective wait data from the wait time clients 132, and then incorporates the wait data into the crowdsourced wait data 160. To obtain predicted wait times, the wait time clients 132 at the points-of-query 180 communicate the wait time server 150 to determine predicted wait times at the points-of-interest 110 based on the crowdsourced wait data 160.

As shown, the wait time client $132_0$ executes on a computing device $135_0$ that is included in a mobile device 130 located at the point-of-interest 110. The wait time client $132_1$ executes on a computing device $135_1$ that is included in the navigation system 182 located at the point-of-query 180. In general, any number of wait time clients 132 may execute on any number of computing devices 135 that are included in any number of mobile or stationary devices in any combination. For example, and without limitation, the wait time client 132 may execute on any type of processing unit that is included in a car navigation system, a laptop, a smartphone, and so forth. Notably, each device may operate at a variety of different locations and any number of devices may be included in the crowdsourced planning system 100. For example, and without limitation, a smartphone may include a central processing unit and the smartphone could, at various different points in time, be located at a variety of different locations.

Based on the input the wait time client 132 receives, the wait time client 132 may interpret a location corresponding to the computing device 135 that is executing the wait time client 132 as the point-of-query 180, the point-of-interest 110, both, or neither. More specifically, as the wait time client 132 generates measured wait data, the wait time unit 132 relays the measured wait data and the current location—interpreted as the point-of-interest 110—to the wait time server 150 for incorporation into the crowdsourced wait data 160. To generate predicted wait times, the wait time server 150 processes the updated crowdsourced wait data 160 based on a wait time predictive model 165. The wait time predictive model 165 may implement any technically feasible algorithm designed to aggregate the crowdsourced wait data 160 into discerning predicted wait data.

The wait time client 132 downloads the predicted wait data from the wait time server 150 and, upon receiving a request for a predicted wait time, the wait time unit 132 processes the request based using the current location—interpreted as the point-of-query 180. Notably, the wait time unit 132 calculates a predicted wait time that reflects the current location in addition to any other relevant and accessible information, such as current time, based on the predicted wait data downloaded from the wait time server 150.

In various embodiments, the wait time client 132 may provide a user interface that enables the user to specify the point-of-interest 110. The user interface may include any amount of planning functionality. For example, and without limitation, the user interface could include a search function for specific types of businesses, a time optimization function to select the best time to run an errand based on both travel time and wait time, and so on.

To maximize opportunities to grow the crowdsourced wait data 160 and, consequently, increase the accuracy of the predicted wait times, the wait time client 132 provides various types of wait data gathering functionality. Notably, the wait time client 132 tailors the wait gathering operations to the available infrastructure and provides, without limitation, a manual entry mode, a proximity sensor mode, and a point-of-sale mode. As part of determining the measured wait time, in the manual entry mode, the wait time client 132 relies primarily on user input. In the proximity sensor mode, the wait time client 132 automatically incorporates data from sensors, such as Bluetooth Low Energy (BLE) sensors, located at the point-of-interest 110 into the measured wait time calculations.

In the point-of-sale mode, the wait time client 132 calculates the wait time based on sales transactions at the point-of-sale system 120 located at the point-of-interest 110. In operation, the point-of-sale system 120 transmits sales transaction information to a financial server 140 located in the public cloud 102. For example, and without limitation, a credit card reader at a grocery store checkout counter could include a credit/debit card payment client that communicates with a financial server provided by a bank and associated with the credit/debit card. In general, the financial server 140 and the point-of-sale system 120 may communicate in any technically feasible fashion. In response, the financial server 140 sends a transaction confirmation, such as a short message system SMS 145 (also known as a text message) to a device that includes the wait time client 132 (e.g., the mobile device 130) and is located at the point-of-interest 110. In general, the financial sever 140 may communicate with the device that includes the wait time client 132 in any manner as known in the art.

The wait time client 132 may be stored in any type of memory that may or may not be integrated with the computing device 135. In some embodiments, the wait time client 132 may be stored in a universal serial bus (USB) flash drive that is connected to a USB port of the computing device 135. The computing device 135 may be any type of device capable of executing application programs.

Figure 1B:
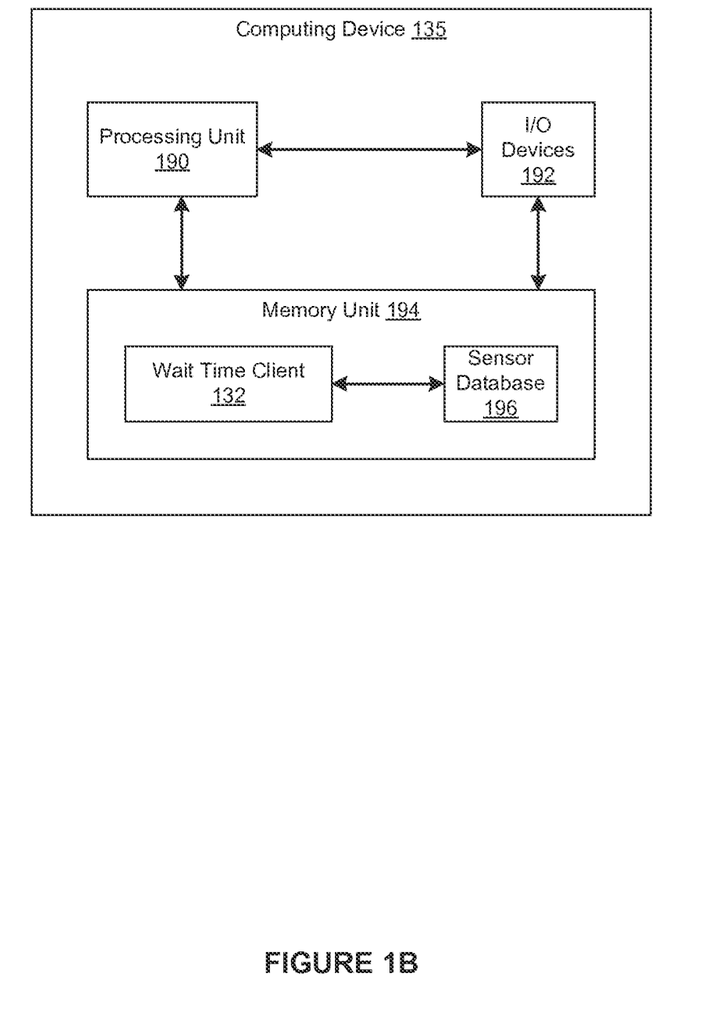
FIG. 1B is a more detailed illustration of the computing device of FIG. 1A, according to various embodiments.

FIG. 1B is a more detailed illustration of the computing device 135 of FIG. 1A, according to various embodiments. As shown, computing device 135 includes, without limitation, a processing unit 190, input/output (I/O) devices 192, and a memory unit 194. Memory unit 194 includes the wait time client 132 and is configured to interact with a sensor database 196.

Processing unit 190 may be implemented as a central processing unit (CPU), digital signal processing unit (DSP), graphics processor unit (GPU), and so forth. I/O devices 192 may include input devices, output devices, and devices capable of both receiving input and providing output. Memory unit 194 may include a memory module or collection of memory modules. The wait time client 132 within the memory unit 194 may be executed by processing unit 190. The sensor database 196 may store timestamps, gyroscope data, accelerometer data, magnetic sensor data, position data, and the like.

Computing device 135 may be implemented as a stand-alone chip, such as a microprocessor, or as part of a more comprehensive solution that is implemented as an application-specific integrated circuit (ASIC), a system-on-a-chip (SoC), and so forth. Generally, computing device 135 may be configured to coordinate the overall operation of a computer-based system, such as the mobile device 130 or the navigation system 182. In other embodiments, the computing device 135 may be coupled to, but separate from the computer-based system. In such embodiments, the computer-based system may include a separate processor that receives data (e.g., audio streams) from and transmits data (e.g., sensor data) to the computing device 135, which may be included in a consumer electronic device, such as a vehicle head unit, navigation system, smartphone, portable media player, personal computer, and the like. However, the embodiments disclosed herein contemplate any technically feasible system configured to implement the functionality of the wait time client 132 and/or the wait time server 150 in any combination.

Wait Time Client

Figure 2:
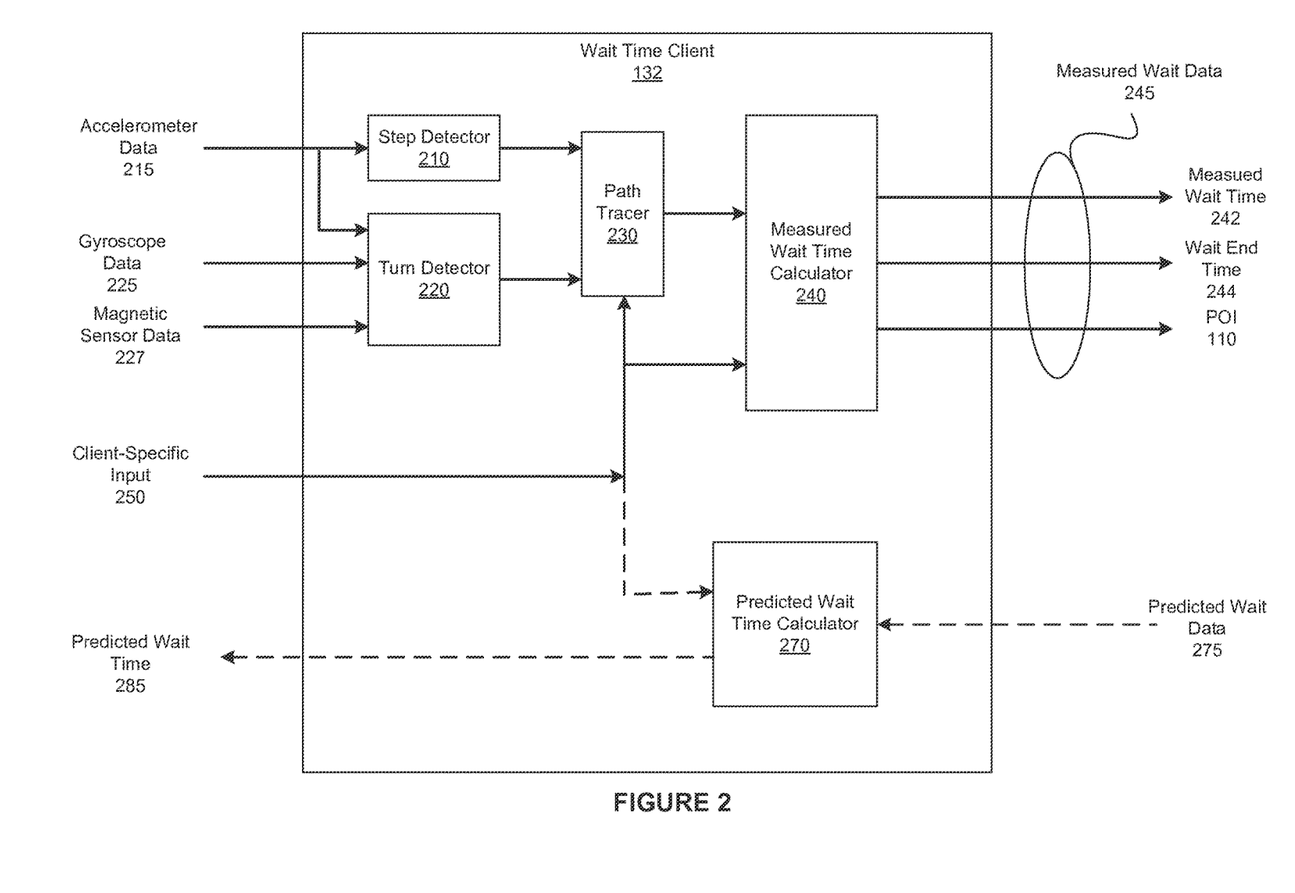
FIG. 2 is a is a more detailed illustration of the wait time client of FIG. 1A, according to various embodiments.

FIG. 2 is a is a more detailed illustration of the wait time client 132 of FIG. 1A, according to various embodiments. In general, the wait time client 182 is integrated as part of a mobile or stationary computer-based device, such as the mobile device 130 or the navigation system 182. The computer-based device, among other things, provides general input data (e.g., sensor data, text messages, etc.) and client-specific input 250, such as user interface preferences, to the wait time client 182. The computer-based device also consumes output data, such as predicted wait time 285, that is generated by the wait time client 182. As part of processing input data and generating the predicted wait time 285, the wait time client 182 communicates with the wait time server 150 transmitting measured wait data 245 and receiving predicted wait data 275.

As shown, the wait time client 132 includes, without limitation, a predicted wait time calculator 270 and a measured wait time calculator 250. The predicted wait time calculator 270 requests the predicted wait data 275 from the wait time server 150 and then deterministically calculates the predicted wait time 285. In contrast, the measured wait time calculator 250 supplies the measured wait data 245 to the wait time server 150 for incorporation into the crowdsourced wait data 160.

In alternate embodiments, the wait time client 132 may be configured to receive the predicted wait data 275 from the wait time server 150 without providing the measured wait data 245. In such embodiments, the measured wait time calculator 240 may be omitted or the functionality provided by the measured wait time calculator 240 may be disabled via a selection mechanism, such as a "privacy" setting in a user interface. In general, alternate embodiments of the predicted wait time calculator 270 may implement any portion of the functionality described herein and the functionality may be distributed in any technically feasible fashion between any number and type of operational units in any combination.

In operation, before calculating the predicted wait time 285, the predicted wait time calculator 270 downloads the predicted wait data 275 from the wait timer server 150. The predicted wait time calculator 270 may perform this download in any technically feasible fashion and in response to any type of stimulus. For instance, and without limitation, the predicted wait time calculator 270 may be configured to periodically re-download the predicted wait data 275 at a configurable interval that represents a tradeoff between bandwidth usage and the data gathering dates represented by the predicted wait data 275. Alternatively, the predicted wait time calculator 270 may be configured to download the predicted wait data 275 on-demand, such as in response to the client-specific input 250 of a "refresh database" user interface selection.

In general the predicted wait data 275 may include any number and type of wait-time-relevant predicted data that is consistent with both the wait time server 150 and the wait time client 132. In some embodiments, the wait time predictive model 165 may process the crowdsourced wait data 160 and generate a set of data points, where each data point includes a wait end time, a predicted wait time, and a location. The wait time server 150 may transmit any requested portion of these data points (including all the data points, a single data point, or a subset of data points corresponding to a range of locations or times), to the predicted wait time calculator 270 as the predicted wait data 275.

Subsequently, in response to client-specific input 250, such as predicted wait time queries, the predicted wait time calculator 270 determines the predicted wait time 285 based on the predicted wait data 275. For example, in some embodiments, the predicted wait data 275 may include data points that may specify a variety of locations and times. In such embodiments, the predicted wait time calculator 270 could perform comparison operations on the predicted wait data 275 to select the data point that is the closest match to the point-of-interest 110 and/or the time-of-interest and then assign the predicted wait time 285 based on the selected data point. In this fashion, the wait time predictive model 165 and the predicted wait time calculator 270 work together to provide the predicted wait time 285 while optimizing the available resources in the crowdsource planning system 100, such as bandwidth.

In general, the predicted wait time calculation functionality described herein may be implemented using any type of algorithms as known in the art and distributed in any technically feasible, consistent fashion between the wait time server 150 and the wait time client 132. For example, and without limitation, in some embodiments, the wait time client 132 may not perform any predicted wait time calculations. In such embodiments, the wait time client 132 may omit the predicted wait time calculator 270, forgo downloading the predicted wait data 275, and relay client-specific input 250 directly to the wait time server 150 at run-time. Such client-specific input 250 may include, without limitation, predicted wait time queries and associated information such as the point-of-interest 110, the point-of-query 180, the wait start time, and the like. The wait time server 150 then calculates the predicted wait time 285 corresponding to the query and transmits the predicted wait time 285 to the wait time client 132.

In alternate embodiments, the computer-based device that executes the wait time client 132 may include additional planning capability. For example, and without limitation, the computer-based device may be the navigation system 182 and a total time calculator included in the navigation system 182 may calculate a total trip time based on both the predicted wait time 285 and a predicted travel time. In other embodiments, the computer-based device may include search functionality that enables the user to select a start location, one or more potential destinations, and or one or more expected travel windows (i.e., afternoon), and then compare the corresponding predicted wait times 285 and/or the total trip times.

In a complementary fashion to the predicted time calculator 270, the measured wait time calculator 240 determines a wait end time 244 and a wait start time for a queue located at the point-of-interest 110. The wait time calculator 240 then subtracts the wait start time from the wait end time 244 to determine a measured wait time 242. After determining the measured wait time 242, the wait time calculator transmits the measured wait data 245 to the wait time server 150. As shown, the measured wait data 245 includes, without limitation, the measured wait time 242, the point-of-interest 110 and the wait end time 244 Upon receiving the measured wait data 245, the wait time server 150 updates the crowdsourced wait data 160 and/or the wait time predictive model 165 to reflect the measured wait data 245.

In alternate embodiments, the measured wait data 245 may include any number and type of wait related data that is relevant to the wait time server 150. For example, and without limitation, if the crowdsourced wait data 160 and the wait time predictive model 165 discriminate based on type of day (e.g., weekday, weekend, holiday, etc.) or season, then the measured wait data 245 could include such information.

In general, the granularity of each of the measured wait data 245, the crowdsourced wait data 160 and the wait time predictive model 165 impacts the overall accuracy of the predicted wait data 275 that the wait time server 150 generates. Further, the volume of the measured wait data 245 received for each of the points-of-interest 246 correlates to the overall reliability of the predicted wait data 275. For these reasons, the wait time client 132 is configured to gather input via the mobile device 130 in a variety of modes, including, without limitation, a manual entry mode, a proximity sensor mode, and a point-of-sale mode. In alternate embodiments, the wait time client 132 may be configured to respond to and leverage any relevant infrastructure that is available at the current location of the mobile device 130.

In the manual entry mode, both the wait start time (i.e., the time that the queue is entered) and the wait end time 244 (the time that the queue is exited) are entered via a user interface as part of the client-specific input 250. Upon receiving a wait start time, the measured wait time calculator 240 stores the wait start time. Subsequently, upon receiving the corresponding wait end time 244, the measured wait time calculator 240 subtracts the stored wait start time from the wait end time 244 to determine the measured wait time 242. The measured wait time calculator 240 then transmits the measured wait data 245 to the wait time server 150. The measured wait data 245 includes, without limitation the measured wait time 242, the wait end time 244, and the point-of-interest 246. The measured wait time calculator 240 assigns the point-of-interest 246 in any technically feasible fashion, such as entry via the user interface, search engine results, or global positioning system (GPS) data.

In the proximity sensor mode, the wait start time is detected via a sensor that is located at the entry of the queue, and the wait end time 244 is detected via another sensor that is located at the exit of the queue. The sensors may be implemented in any technically feasible fashion that enables communication with the mobile device 130 that executes the wait time client 132. In some embodiments, the mobile device 130 may be a Bluetooth enabled device, such as a smartphone, and the sensors may be Bluetooth Low Energy (BLE) sensors that are installed at the point-of-interest 110. The sensors may transmit information, such as the point-of-interest 110 and the type of sensor (entry sensor or exit sensor) to the mobile device 130 using any technique as known in the art. Such techniques may include a notification beacon, transmission of a "sensor-encountered" message, and so forth. For example, in some embodiments, the sensors may transmit a unique identification (ID), and the wait time server 150 is configured to associate each ID with either an entry to a queue or an exit from a queue. Further, in some embodiments, the transmission may include the time of encounter. In other embodiments, the mobile device 130 may store the time that the transmission is received as a timestamp.

Upon receiving a wait start time, the measured wait time calculator 240 stores the wait start time. Subsequently, upon receiving the corresponding wait end time 244, the measured wait time calculator 240 subtracts the stored wait start time from the wait end time to determine the measured wait time 242. The measured wait time calculator 240 then transmits the measured wait data 245 to the wait time server 150. Again, the measured wait data 245 includes, without limitation, the measured wait time 242, the wait end time 244, and the point-of-interest 110. The measured wait time calculator 240 assigns the point-of-interest 110 in any technically feasible fashion, such as entry via the user interface, search engine results, global positioning system (GPS) data, or predetermined BLE sensor location.

Point-of-Sale Mode

In the point-of-sale mode, the point-of-sale system 120 is located at the point-of-interest 110, the sales payment occurs via a computerized sales transaction, and the mobile device 130 receives confirmation of the sales transaction. More specifically, in some embodiments, the sales payment may occur via a credit card/debit card reader, the financial server 140 processes the associated sales transaction and then sends the SMS 145 to the mobile device 140 confirming the sales transaction and including information on the point-of-interest 110. In some embodiments, the SMS 145 may include the time of the sales transaction. In other embodiments, the mobile device 130 may store the time that the SMS 145 is received as the time of the sales transaction.

After processing the SMS 145, the mobile device 130 relays the sales transaction information to the wait time client 132 (including the measured wait time calculator 240) as part of the client-specific input 250. The wait time client 132 interprets the sales transaction as the wait time end 244. Further, to enable fully automatic calculation of the measured wait time, the wait time client 132 leverages the wait time end 244 in addition to tracked sensor data to compute the measured wait time 242.

To facilitate the point-of-sale mode, the wait time client 132 and the mobile device 130 work together in a continuous fashion to store sensor data that tracks the motion of the mobile device 130 and then process the motion data. Notably, upon receiving the wait end time 244, the wait time client 132 backtracks from the wait time end 244 to extract a queue path from end of the queue (at the point-of-sale 120) to a start of the queue and a corresponding wait start time.

More specifically, as shown, the wait time client 132 includes a step detector 110, a turn detector 120, and a path tracer 230. The step detector 110 receives accelerometer data 215 and calculates a rate of steps based on the accelerometer data 215 and the time associated with the accelerometer data 215. The step detector 110 may be implemented in any technically feasible fashion and may be integrated into the mobile device 130. The turn detector 120 receives the accelerometer data 215, gyroscope data 225, and magnetic sensor data 227 and determines when the mobile device 130 executes a turn. The turn detector 110 may be implemented in any technically feasible fashion using any sensor data available to the mobile device 130.

Based on the rate of steps and the detected turns, the path tracer 230 backtracks from the wait time end 244 at the point-of-sale 120 to the wait time start at the entrance to the queue. The path tracer 230 implements a pattern-based heuristic to determine the queue path. In particular, the path tracer 230 is configured to recognize specific patterns of walking (i.e., rate of steps) and angles of motion (i.e., detected turns) that are characteristic of motion within a queue. In one embodiment, the pattern of walking represents a walk-stop-walk-stop pattern often observed in queues. Further, the angles of motion characteristic of movement within the queue lie within a fixed threshold that reflects the "width" of a typical queue. In alternate embodiments, the path tracer 230 may be configured to identify characteristics of motion within queues in any technically feasible fashion and based on any heuristics, including other patterns of motion and angles, and/or other sensor data.

Path Tracing

Figure 3:
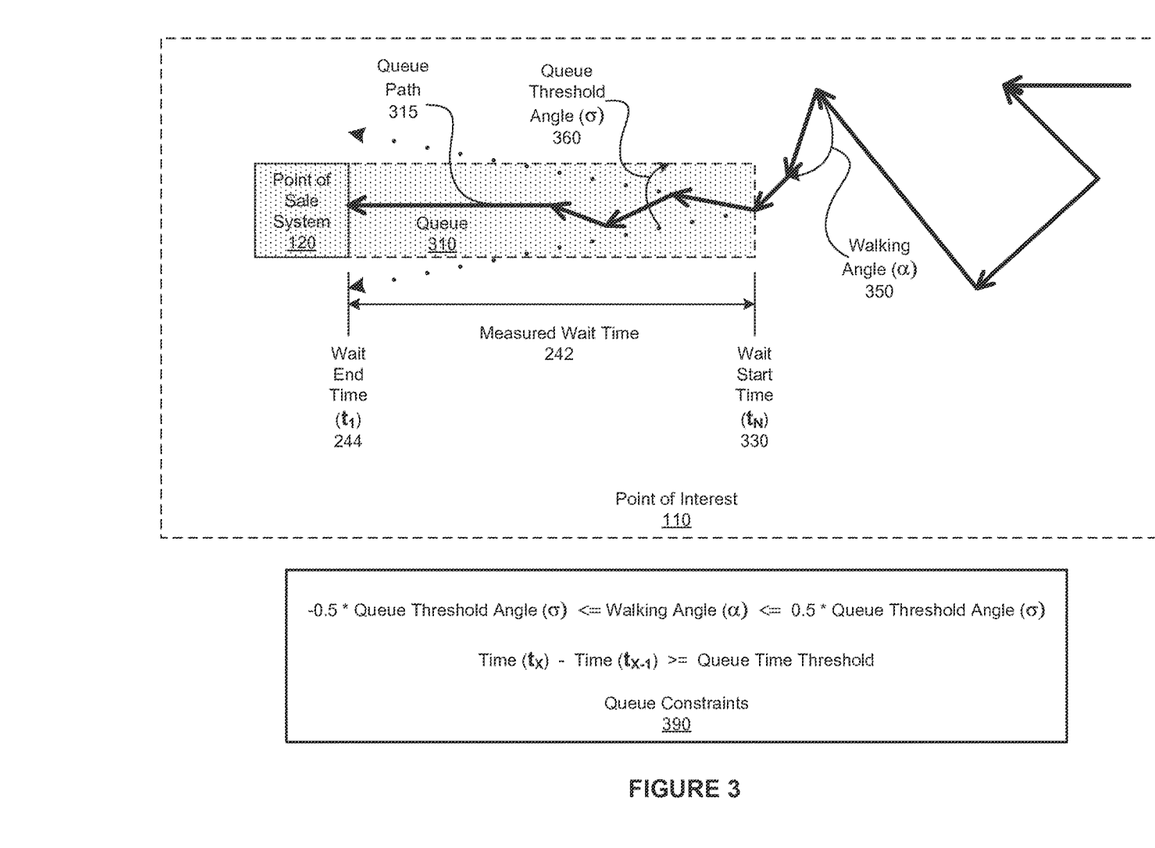
FIG. 3 is a conceptual illustration of a queue path detected by the path tracer of FIG. 2 when operating in a point-of-sale mode, according to various embodiments.

FIG. 3 is a conceptual illustration of a queue path 315 detected by the path tracer 230 of FIG. 2 in a point-of-sale mode, according to various embodiments. For explanatory purposes only, the path followed by the mobile device 130 is depicted with a heavy line that includes arrows that delineate turns.

Based on the time-stamped sensor data that is logged by the wait time client 132 and queue constraints 390, the step detector 210, the turn detector 220, and the path tracer 230 backtrack from the wait end time ($t_1$) 244 to determine a wait start time ($t_N$) 330. In operation, the step detector 210 determines the rate of steps, the turn detector 220 detects the angle of motion, and the path tracer 230 compares the rate of steps and the angle of motion (i.e., detected turns) at various points in time $t_x$, starting at the wait end time 244 ($t_1$), to the queue constraints 230. If the rate of steps and the angle of motion comply at a specific point in time $t_x$ with the queue constraints 230, then the path tracer 230 continues to trace backwards. However, when the rate of steps and/or the angle of motion no longer comply with the queue constraints 230, then the path tracer 230 considers the previously considered point in time $t_{x-1}$ to be the wait start time ($t_N$) 330

As shown, the queue constraints 230 constrain a walking angle 350 (i.e., the angle between the location of the mobile device 130 at $t_{x-1}$ and the location of the mobile device at $t_x$) to lie within a range of angles defined by the queue threshold angle 360. In addition, the queue constraints 230 constrain the velocity of the mobile device 130 to a predetermined threshold that represents the typically relatively slow motions within the queue 310. In alternate embodiments, the queue constraints 230 are configured to represent a shape of the queue that is not straight, such as an S-shaped queue. In some embodiments, the client-specific input 250 includes a configuration parameter that specifies the shape of the queue, and the wait time client 132 is configured to select the appropriate queue constraints 230 based on this configuration parameter.

Leveraging Crowdsourced Wait Data to Compute Predicted Wait Times

Figure 4:
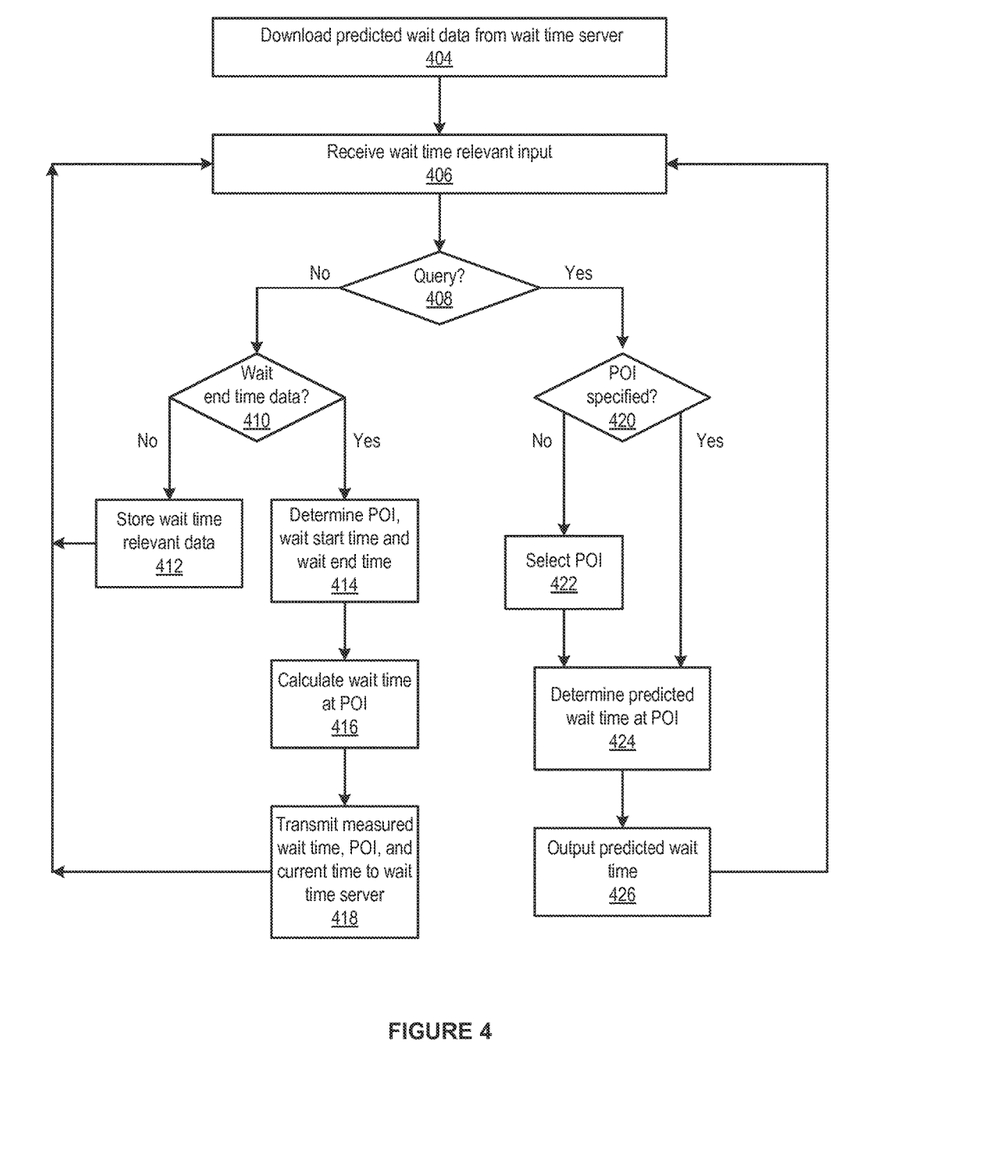
FIG. 4 is a flow diagram of method steps for leveraging crowdsourced wait data to compute predicted wait times, according to various embodiments.

FIG. 4 is a flow diagram of method steps for leveraging crowdsourced wait data to compute predicted wait times. Although the method steps are described in conjunction with the systems of FIGS. 1-3, persons skilled in the art will understand that any system configured to implement the method steps, in any order, falls within the scope of the present invention.

As shown, a method 400 begins at step 404, where the wait time client 132 downloads the predicted wait data 275 from the wait time server 150. More specifically, the predicted wait time calculator 270 (included in the wait time client 132) retrieves the predicted wait data 275 that the wait time sever 150 generates based on the crowdsourced wait data 160. The wait time client 132 may initiate downloads of the predicted wait data 275 at any time, thereby enabling the wait time client 132 to reflect a current version of the crowdsourced wait data 160 as opposed to a dated version of the crowdsourced wait data 160.

At step 406, the wait time client 132 receives wait-time-relevant input, such as the client-specific input 250, sensor data, and the SMS 145 that includes sales transaction information. For example, the wait-time-relevant input could be a client-specific query—a request entered via a user interface of the wait time client 132 for a predicted wait time (such as the wait time at a grocery store at a noon). In another example, the wait-time-relevant input may be information that provides insight into measured (i.e., experienced) wait times, such as the current location of the wait time client 132. At step 408, the wait time client 132 determines whether the received wait-time-relevant input corresponds to a wait time query (e.g., "what is the grocery store with the shortest wait time within 5 miles."). If, at step 408, the wait time client 132 determines that the wait-time-relevant input is a wait time query, then the method 400 proceeds directly to step 420. At step 408, if the wait time client 132 determines that the wait-time-relevant input is not a wait time query, then the method 400 proceeds to step 410.

At step 410, the wait time client 132 evaluates the wait-time-relevant input to determine whether the wait-time-relevant input is associated with the wait end time 244. If, at step 410, the wait time client 132 determines that the wait-time-relevant input is associated with the wait end time 244, then the method 400 proceeds directly to step 414. At step 410, if the wait time client 132 determines that the wait-time-relevant input is not associated with the wait end time 244, then the method 400 proceeds to step 412.

At step 412, the wait time client 132 stores the wait-time-relevant data for processing when the wait end time 244 is determined. For example, and without limitation, if the wait-time-relevant data includes the wait start time 330, then the wait time client 132 would store the wait start time 330. Similarly, if the wait-time-relevant data includes the accelerometer data 215 for a specific point in time, then the wait time client 132 would store the accelerometer data 215 and the associated time in any available memory and in any form. The method 400 then returns to step 406. The wait time client 132 continues to cycle through steps 406-412, storing wait-time-relevant data until the wait time client 132 detects that either the wait-time-relevant data corresponds to a wait time query or is associated with the wait end time 244.

At step 414, the wait time client 132 processes the wait-time-relevant data that is associated with the wait end time 244. Specifically, the wait time client 132 determines the point-of-interest 110, the wait end time 244, and the wait start time 330. The wait time client 132 may determine the point-of-interest 110, the wait end time 244, and the wait start time 330 in any technically feasible fashion. For example, and without limitation, in a point-of-sale mode, the wait time client 132 may implement the method disclosed in FIG. 5 to determine the wait start time 330 based on the wait end time 244 and sensor data that is included in the wait-time-relevant data and stored at step 412.

At step 416, the measured wait time calculator 240 calculates the measured wait time 242 based on the wait end time 244 and the wait start time 330. At step 418, the measured wait time calculator 240 transmits the measured wait data 245 (including the measured wait time 242, the wait end time 244, and the point-of-interest 110) to the wait time server 150. As part of step 418, the measured wait time calculator 240 may calculate and/or transmit any additional values for the measured wait data 245 to the wait time server 150. The method 400 then returns to step 406. The wait time client 132 continues to cycle through steps 406-418, processing wait-time-relevant data until the wait time client 132 detects that the wait-time-relevant data corresponds to a wait time query.

At step 420, the wait time client 132 evaluates the wait time query to determine whether the wait time query specifies the point-of-interest 110. If, at step 420, the wait time client 132 determines that the wait time query specifies the point-of-interest 110, then the method 400 proceeds directly to step 424. At step 420, if the wait time client 132 determines that the wait time query does not specify the point-of-interest 110, then the method 400 proceeds to step 422. At step 422, the wait time client 132 selects the point-of-interest 110. The wait time client 132 may select the point-of-interest 110 in any technically feasible fashion, such as matching search result locations to predetermined locations that correspond to the points-of-interest 110 supported by the crowdsourced wait data 160.

At step 424, the predicted wait time calculator 270 determines the predicted wait time 285 based on the predicted wait data 275, the anticipated wait start time 330, and the point-of-interest 110. In alternate embodiments, the wait time calculator 270 may consider additional wait-time-relevant data as part of computing the predicted wait time 285. In some embodiments the wait time calculator 270 may be configured to filter the predicted wait data 275 based on a date corresponding to each data point (e.g., consider only data points obtained within the last year). At step 426, the wait time client 132 outputs the predicted wait time 285. The predicted wait time 285 may be utilized in any number of planning techniques. For example, and without limitation, the predicted wait time 285 may be overlaid on a map or summed with predicted travel times to determine overall trip times. The method 400 then returns to step 406. The wait time client 132 continues to cycle through steps 406-426, processing wait-time-relevant data based on the nature of the data.

Computing Wait Times Based on Point-of-Sale Transactions

Figure 5:
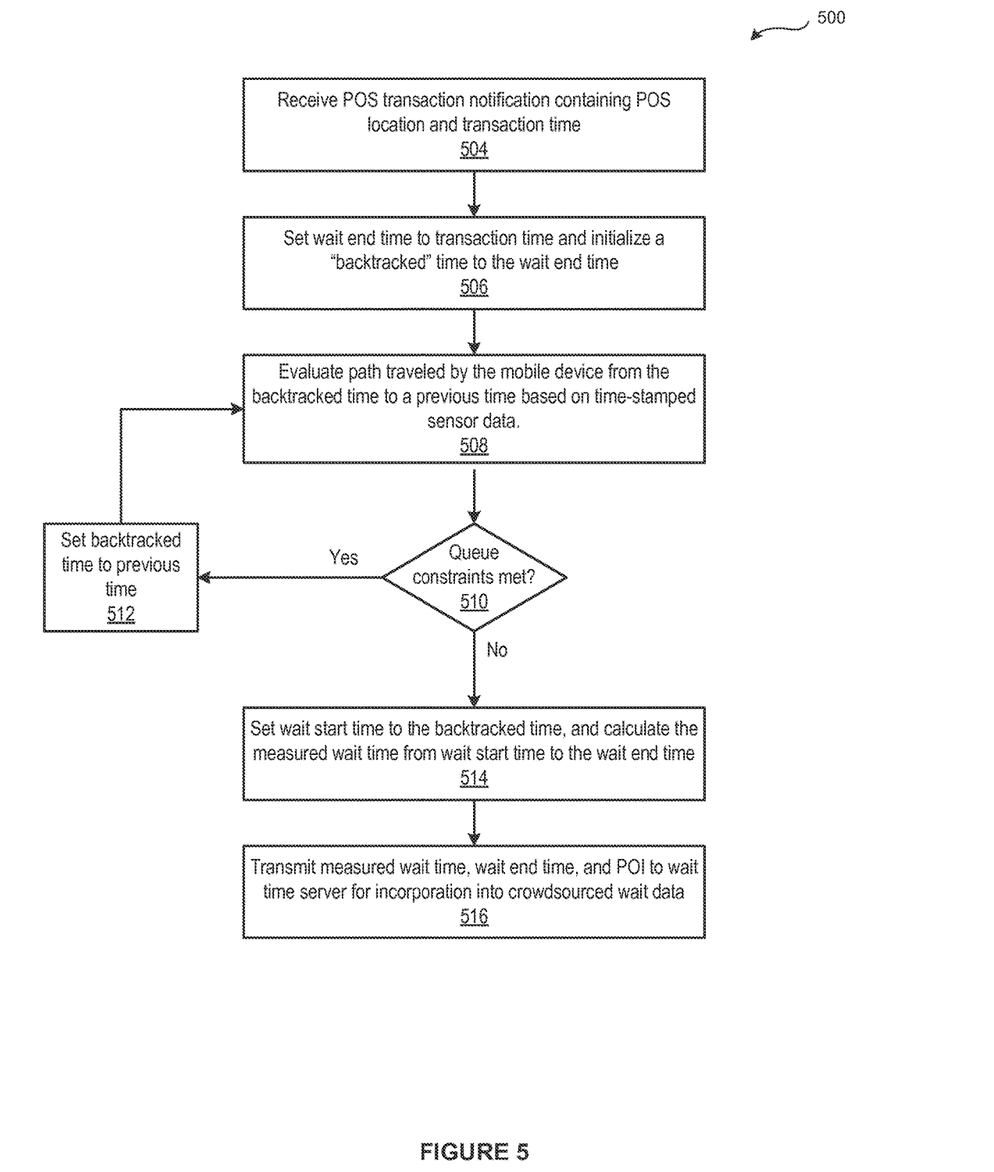
FIG. 5 is a flow diagram of method steps for backtracking from a point-of-sale transaction to compute the time spent waiting in a queue, according to various embodiments.

FIG. 5 is a flow diagram of method steps for backtracking from a point-of-sale transaction to compute the time spent waiting in a queue. Although the method steps are described in conjunction with the systems of FIGS. 1-3, persons skilled in the art will understand that any system configured to implement the method steps, in any order, falls within the scope of the present invention.

As shown, a method 500 begins at step 504, where the path tracer 230 receives a sales transaction notification that includes the location of the point-of-sale system 120 and the transaction time. In some embodiments, the path tracer 230 may receive the sales transaction notification via the mobile device 130 when the mobile device 130 receives the SMS 145 corresponding to the sales transaction from the financial server 150. As part of step 504, the path tracer 230 assigns the point-of-interest 110 to correspond to the location of the point-of-sale.

At step 506, the path tracer 230 initializes backtracking operations that start from the wait end time 244 (and the location of the point-of-sale) and end at the time (and location) at which the mobile device 130 entered the queue 130. In particular, the path tracer 230 sets both the wait end time 244 and a "backtracked" time (i.e., the time traced back to thus-far) to the transaction time. At step 508, the path tracer 230 evaluates the rate of steps provided by the step detector 210 and the motion detected by the turn detector 220 between the backtracked time and a previous time for which sensor data is available. As disclosed previously herein, the step detector 210 tracks the rate of steps and the turn detector 220 detects turns (i.e., motion) based on recorded and time-stamped sensor data associated with the mobile device 130.

At step 510, the path tracer 230 compares the rate of steps and the motion to the queue constraints 230 to determine whether the mobile device 230 was in the queue 130 at the backtracked time. Notably, the path tracer 230 is configured to recognize specific patterns of walking (i.e., rate of steps) and angles of motion (i.e., detected turns) that are characteristic of motion within a queue based on the queue constraints 230. If, at step 510, the path tracer 230 determines that the queue constraints 230 are met at the backtracked time, then the method 500 proceeds to step 512. At step 512, the path tracer 230 sets the backtracked time to the previous time and the method 500 returns to step 508. The path tracer 230 continues to cycle through steps 508-512, backtracking along the path of the mobile device 230 to determine the queue path 315 until the path tracer 230 determines that the queue constraints 230 are not met at the backtracked time.

At step 510, if path tracer 230 determines that the queue constraints 230 are not met at the backtracked time, then the method 500 proceeds directly to step 514. At step 514, the path tracer 230 sets the wait start time 330 to the backtracked time, and the measured wait time calculator 240 calculates the measured wait time 242 based on the wait end time 244 and the wait start time 330. At step 516, the measured wait time calculator 240 transmits the measured wait data 245 (including the measured wait time 242, the wait end time 244, and the point-of-interest 110) to the wait time server 150 for incorporation into the crowdsourced wait data 160, and the method 500 ends.

In sum, the disclosed techniques may be used to predict wait times at various types of queues, such as lines at point-of-sale (POS) counters. A wait time client includes both a predicted wait time calculator and a measured wait time calculator. To estimate wait times at points-of-interest at times-of-interest, the predicted wait time calculator leverages a predicted wait time database that is maintained by a wait time server. In a supportive manner, the measured wait time calculator gathers and transmits measured wait data, including wait time, transaction (i.e., sale) time, and location to the wait time server. Upon receiving measured wait data, the wait time server incorporates the measured wait data into crowdsourced wait data that reflects measured wait data that the wait time server previously received. The wait time server then populates the predicted wait time data based on a predictive wait time model that processes the crowdsourced wait data. In this manner, the wait time client enables the wait time server to act as an accessible repository for crowdsourced measured wait times—aggregating measured wait times into up-to-date and realistic estimated wait times.

To increase the utility and scope of the predicted wait time database, the wait time client supports a variety of data gathering modes to measure wait times. Each data gathering mode is tailored to the available infrastructure. For example, and without limitation, the wait time client may support a manual entry mode, a proximity sensor mode, and a point-of-sale mode. Notably, in the point-of-sale mode, the wait time client evaluates a sales transaction message sent from financial institutions to determine a queue end time and queue end location (point-of-sale) and then performs backtracking operations from the end time and end location to determine the entry time to the queue. More specifically, the wait time client traces a queue path backwards from the point-of-sale based on predetermined queue movement patterns and stored sensor data, such as, and without limitation, accelerometer data and gyroscope data.

At least one advantage of the disclosed techniques is that they enable optimized planning processes based on more accurate predicted wait times at queues. Not only does the wait time client allow users to minimize wait times at queues, but the wait time application also facilitates comprehensive trip planning. For example, and without limitation, the predicted wait time provided by the wait time client may be combined with other navigation-related information, such as estimated travel time, to select a particular point-of-interest based on total trip time. Further, since the wait time client continuously provides measured wait data, the wait time client enables the wait time server to provide a dynamic, crowdsourced-based wait time model that realistically predits wait times for a wide range of points-of-interest and times-of-interest. Because the wait time client supports a variety of data gathering techniques, including one that requires no additional infrastructure, the wait time client facilitates an evolving and diverse crowdsourced predicted wait time system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, and without limitation, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of audiovisual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method implemented by a computing device for predicting a wait time at a point-of-interest, the method comprising:
   receiving, via a processor, sensor data from a first sensor, wherein the sensor data is associated with movements of a mobile device;
   analyzing, via the processor, the sensor data to determine a duration of time for which a path of the mobile device satisfies one or more queue pattern constraints; and
   generating a predicted wait time for the point-of-interest based on the duration of time.

2. The method of claim 1, further comprising, prior to receiving the sensor data, determining that a location of the mobile device is associated with the point-of-interest, wherein the predicted wait time is generated based on a start time and an end time associated with the mobile device.

3. The method of claim 2, wherein determining at least one of the start time and the end time comprises receiving a message, and analyzing the message to determine a transaction time associated with the first point-of-interest.

4. The method of claim 3, wherein the message is received from a proximity beacon.

5. The method of claim 3, wherein determining the end time comprises receiving a message that corresponds to a financial transaction, and analyzing the message to determine a timestamp associated with the message.

6. The method of claim 3, wherein determining the start time comprises:
   performing one or more backtracking operations on the sensor data to determine the path from a first location associated with the transaction time to second location associated with a previous time specified in the sensor data, wherein the mobile device moving between the first location and the second location satisfies the one or more queue pattern constraints; and
   setting the start time to the previous time.

7. The method of claim 1, further comprising performing one or more search operations based on a location of the mobile device to identify the point-of-interest.

8. A non-transitory computer-readable storage medium including instructions that, when executed by a processor, cause the processor to predict wait times at points-of-interest by performing the steps of:
- receiving sensor data from a first sensor, wherein the sensor data is associated with movements of a mobile device;
- analyzing the sensor data to determine a duration of time for which a path of the mobile device satisfies one or more queue pattern constraints; and
- generating a predicted wait time for the point-of-interest based on the duration of time.

9. The non-transitory computer-readable storage medium of claim 8, further comprising, prior to receiving the sensor data determining that a location of the mobile device is associated with the point-of-interest, wherein the predicted wait time is generated based on a start time and an end time associated with the mobile device.

10. The non-transitory computer-readable storage medium of claim 9, wherein determining the start time comprises:
- receiving a message, and analyzing the message to determine a transaction time associated with the first point-of-interest;
- performing one or more backtracking operations on the sensor data to determine the path from a first location associated with the transaction time to a second location associated with a previous time specified in the sensor data, wherein the mobile device moving between the first location and the second location satisfies the one or more queue pattern constraints; and
- setting the start time to the previous time.

11. The non-transitory computer-readable storage medium of claim 10, wherein the one or more queue pattern constraints include at least one of a maximum change in direction and a maximum change in velocity.

12. The non-transitory computer-readable storage medium of claim 10, wherein at least one of the one or more backtracking operations comprises a step-detection operation.

13. The non-transitory computer-readable storage medium of claim 10, wherein at least one of the one or more backtracking operations comprises a turn-detection operation.

14. The non-transitory computer-readable storage medium of claim 8, further comprising estimating a travel time to the first point-of-interest and calculating a total time based on the predicted wait time and the travel time.

15. The non-transitory computer-readable storage medium of claim 8, wherein analyzing the sensor data comprises detecting one or more turns that satisfy the one or more queue pattern constraints.

16. The non-transitory computer-readable storage medium of claim 8, wherein analyzing the sensor data comprises detecting a rate of steps that satisfy the one or more queue pattern constraints.

17. The non-transitory computer-readable storage medium of claim 8, wherein the sensor data comprises at least one of accelerometer data, gyroscope data, and magnetometer data.

18. A system configured to predict wait times, the system comprising:
- a processor; and
- a memory coupled to a processor and including a wait time calculator, wherein, when executed by the processor, the wait time calculator is configured to:
  - receive sensor data from a first sensor, wherein the sensor data is associated with movements of a mobile device;
  - analyze the sensor data to determine a duration of time for which a path of the mobile device satisfies one or more queue pattern constraints; and
  - generate a predicted wait time for the point-of-interest based on the duration of time.

* * * * *